(12) United States Patent
Sessions

(10) Patent No.: US 12,379,017 B2
(45) Date of Patent: Aug. 5, 2025

(54) NORMALIZING TENSION DISTRIBUTION AND MINIMIZING SIDEWALL ABRASION WITHIN ANGULAR DRIVE BELT SYSTEMS

(71) Applicant: Liftwave, Inc., Somerville, MA (US)

(72) Inventor: Blake Sessions, Boston, MA (US)

(73) Assignee: Liftwave, Inc., Somerville, MA (US)

( * ) Notice: Subject to any disclaimer, the term of this patent is extended or adjusted under 35 U.S.C. 154(b) by 0 days.

(21) Appl. No.: 18/377,416

(22) Filed: Oct. 6, 2023

(65) Prior Publication Data

US 2024/0167543 A1 May 23, 2024

Related U.S. Application Data

(63) Continuation of application No. 16/630,109, filed as application No. PCT/US2018/041497 on Jul. 10, 2018, now Pat. No. 11,835,132.

(60) Provisional application No. 62/530,420, filed on Jul. 10, 2017.

(51) Int. Cl.
| | |
|---|---|
| *F16H 7/14* | (2006.01) |
| *F16G 1/00* | (2006.01) |
| *F16H 7/02* | (2006.01) |
| *F16H 7/12* | (2006.01) |
| *F16H 19/00* | (2006.01) |
| *F16H 55/36* | (2006.01) |

(52) U.S. Cl.
CPC ............... *F16H 7/02* (2013.01); *F16G 1/00* (2013.01); *F16H 7/12* (2013.01); *F16H 7/1263* (2013.01); *F16H 7/14* (2013.01); *F16H 19/005* (2013.01); *F16H 55/36* (2013.01); *F16H 2055/363* (2013.01)

(58) Field of Classification Search
CPC ..... F16H 7/02; F16H 7/12; F16H 7/22; F16H 19/005; F16H 55/36; F16H 2055/363
See application file for complete search history.

(56) References Cited

U.S. PATENT DOCUMENTS

| | | | |
|---|---|---|---|
| 63,266 | A | 3/1867 | Lewis et al. |
| 376,174 | A | 1/1888 | Adamson |
| 423,046 | A | 3/1890 | Gregg |
| 1,739,053 | A | 12/1929 | Wilhelm |

(Continued)

FOREIGN PATENT DOCUMENTS

| | | |
|---|---|---|
| CN | 1169050 | 12/1958 |
| CN | 1084621 | 3/1994 |

(Continued)

OTHER PUBLICATIONS

Extended European Search Report in EP Application No. 18832320.8, dated Mar. 18, 2020, 9 pages.

(Continued)

*Primary Examiner* — Gregory Robert Weber
(74) *Attorney, Agent, or Firm* — Fish & Richardson P.C.

(57) ABSTRACT

This disclosure relates to methods and apparatuses of employing belts for an angular drive. A twisted geometry is applied to a first free span of the belt. A sheave supports the first free span of the belt at a first extremity of the first free span and sheave is at least one of positioning and orienting the rotating sheave or the driven sheave so as to misalign a geometric centerline of the first free span of belt at a given fleet angle with respect to a second extremity of the first free span.

10 Claims, 22 Drawing Sheets

(56) References Cited

U.S. PATENT DOCUMENTS

| | | | |
|---|---|---|---|
| 2,522,148 A | 9/1950 | Traxler | |
| 2,639,643 A | 5/1953 | Palmer | |
| 2,872,831 A | 2/1959 | Wood | |
| 3,025,658 A * | 3/1962 | Steichele | D01H 1/241 |
| | | | 474/131 |
| 3,110,190 A | 11/1963 | Belting et al. | |
| 3,365,966 A | 1/1968 | Heyer | |
| 3,543,608 A | 12/1970 | Meihak | |
| 3,691,860 A | 9/1972 | Danuser | |
| 3,748,917 A | 7/1973 | Berg | |
| 3,774,464 A | 11/1973 | McCanse | |
| 3,776,052 A | 12/1973 | Campbell | |
| 3,821,906 A | 6/1974 | Berg | |
| 3,919,893 A | 11/1975 | Boehm et al. | |
| 4,020,619 A | 5/1977 | Massaro | |
| 4,452,193 A | 6/1984 | Morris | |
| 4,642,071 A | 2/1987 | Botton | |
| 4,990,125 A * | 2/1991 | Stuemky | F16G 1/08 |
| | | | 474/261 |
| 5,121,648 A | 6/1992 | Seiler | |
| 5,167,195 A | 12/1992 | Guerreschi | |
| 5,209,705 A | 5/1993 | Gregg | |
| 5,361,566 A | 11/1994 | Hohnl | |
| 5,669,841 A | 9/1997 | Schick | |
| 5,984,819 A | 11/1999 | McComber | |
| 6,453,834 B1 | 9/2002 | Tajima et al. | |
| 6,651,413 B2 | 11/2003 | Papke | |
| 7,427,247 B2 | 9/2008 | Melone | |
| 8,197,372 B2 | 6/2012 | Wu et al. | |
| 9,145,955 B2 * | 9/2015 | Ferlay | F16H 9/04 |
| 9,752,650 B2 | 9/2017 | Kojima et al. | |
| 10,088,019 B2 | 10/2018 | Al-Hawaj | |
| 10,780,965 B2 | 9/2020 | Li | |
| 2006/0025255 A1 | 2/2006 | Melone | |
| 2007/0219031 A1 | 9/2007 | Jones | |
| 2011/0132695 A1 | 6/2011 | Aziz et al. | |
| 2015/0027249 A1 | 1/2015 | Sessions | |
| 2016/0040759 A1 | 2/2016 | Gergis | |
| 2016/0067841 A1 | 3/2016 | Schwaiger | |
| 2016/0091065 A1 | 3/2016 | Sessions | |
| 2019/0016429 A1 | 1/2019 | Li | |
| 2020/0115043 A1 | 4/2020 | Ljung | |
| 2021/0086148 A1 | 3/2021 | Gross et al. | |
| 2022/0194735 A1 | 6/2022 | Sessions et al. | |

FOREIGN PATENT DOCUMENTS

| | | |
|---|---|---|
| CN | 105121899 | 12/2015 |
| DE | 3836727 | 5/1990 |
| JP | 2000-245985 | 9/2000 |
| JP | 2002-349649 | 12/2002 |
| RU | 94032290 | 8/1996 |
| RU | 2308624 | 10/2007 |
| RU | 2549428 | 3/2015 |
| SU | 1133453 | 1/1985 |
| WO | WO 2008117542 | 10/2008 |
| WO | WO 2008118259 | 10/2008 |

OTHER PUBLICATIONS

Indonesian Office Action in ID Appln. No. P00202001029, dated Aug. 25, 2021, 9 pages (with English Translation).

International Preliminary Report on Patentability in International Application No. PCT/US2018/041497, dated Jan. 23, 2020, 7 pages.

International Search Report and Written Opinion in International Application No. PCT/US2018/041497, dated Sep. 19, 2018, 8 pages.

Russian Office Action in RU Appln. No. 2020105871/11, dated Dec. 10, 2021, 13 pages (with English Translation).

\* cited by examiner

ORTHOGONAL (NON-AXIAL) TENSION COMPONENT

Sheave pressure  $P = \dfrac{T}{R_{pulley} \, 2R}$ $$L_1 = \frac{X}{\cos\theta}$$

$$L_2 = R_{sheave} \cdot 2\theta$$

$$\sin\theta = \frac{X}{2R_{sheave}}$$

$$\theta = \sin^{-1}\left(\frac{X}{2R_{sheave}}\right)$$

If $X \sim L_2$, small angle approximation $$L_1 = \frac{X}{\cos\left(\sin^{-1}\left(\frac{X}{2R_{sheave}}\right)\right)}$$

$$L2 = R_{Sheave} * 2\sin^{-1}\left(\frac{X}{2R_{Sheave}}\right)$$

All in terms of $\theta$.

$$\theta = \sin^{-1}\left(\frac{X}{2R_{Sheave}}\right)$$

$\Delta L =$ $$\sin\theta = \frac{\delta}{R_{Sheave}}$$

$$\delta = R_{Sheave}\sin\theta$$

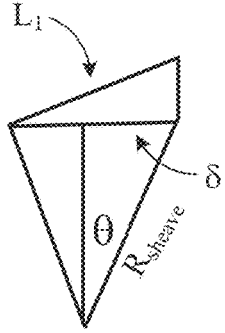

FIG. 21

$$\cos\theta = \frac{2\delta}{L_2} \longrightarrow L_2 = \frac{2\delta}{\cos\theta} = \frac{2R_{Sheave}\sin\theta}{\cos\theta} = \boxed{2R_{Sheave}\tan\theta}$$

then $\Delta L = 2R_{Sheave}\theta - 2R_{Sheave}\tan\theta = D_{Sheave}(\theta - \tan\theta)$ SLACK $(\Delta L) = D_{Sheave}(\theta - \tan\theta)$ Maclaurin series for $\tan\theta = \theta + \frac{2\theta^3}{6} + \cdots$ with $\theta \sim \frac{X}{2R_{Sheave}}$ $$\Delta L = \frac{2\theta^3 D_{Sheave}}{6} = \frac{\theta^3 D_{Sheave}}{3}$$

NORMALIZING TENSION DISTRIBUTION AND MINIMIZING SIDEWALL ABRASION WITHIN ANGULAR DRIVE BELT SYSTEMS

CROSS REFERENCE TO RELATED APPLICATIONS

The present application is a continuation of U.S. application Ser. No. 16/630,109, filed Jan. 10, 2020, which is a 35 U.S.C. § 371 of International Application No. PCT/US2018/041497, filed Jul. 10, 2018, which claims priority to U.S. Provisional Application No. 62/530,420 filed Jul. 10, 2017, entitled "Normalizing Tension Distribution and Minimizing Sidewall Abrasion Within Angular Drive Belt Systems," the entirety of which application is hereby incorporated herein by reference.

TECHNICAL FIELD

The present disclosure relates to belt-based power transfer methods and systems.

BACKGROUND

Open-ended flat belts are used to transfer power in oscillatory linear applications such as elevators, forklifts, and scissor lifts. Innovations in the material construction of flat belts have resulted in improvement of belt performance. These belts have many advantages over wire ropes, including maintenance-free operation for an extended service life, a low cost of manufacture, and a small design envelope given a set of working loads.

It's common practice to exercise great caution in the application of flat belts, as incorrect placement or alignment of sheaves can result in premature (and potentially catastrophic) belt failure. Flat belts are more sensitive to sheave misalignment than wire ropes. In general flat belts (i.e. belts with no teeth) are not intended for twisted geometries. To take a particular example, a fleet angle of 0.25 degree would shorten the service life of a wire rope by a noticeable fraction, perhaps reducing the working life by 15%. The wire rope must flex laterally over the flange to accommodate the required exit angle, but it is fully capable of flexing in this direction.

Flat belts, on the other hand, are quite stiff in the direction orthogonal to their principal axis of flexion, and as a result, that same 0.25 degree fleet angle might shorten the life of a steel wire rope reinforced polyurethane flat belt by 95% or more.

Another clear advantage that wire ropes maintain over flat belts is their ability to bend in any direction. This allows a designer to place sheaves that are out-of-plane with each other, enabling them to create much more complex arrangements of sheaves that provide enhanced functionality. Belts may likewise be implemented with out-of-plane sheaves, though the placement and arrangement of sheaves is more constrained than that of wire rope. If a belt is to be twisted in a free span between two sheaves, the span must meet a certain prescribed minimum length in general engineering practice. For a 90 degree twist, this span is generally recommended to be at least 20× the belt width. This metric is commonly referred to as the "twist ratio": the length of the free span divided by the belt width, for a 90-degree twist. To take an example, consider a belt with a 20 mm width, a 300 mm free span, and a 45 degree twist. The twist ratio would then be 30:1 for this span. Twists that are more aggressive than 20:1 are generally not recommended in engineering practice, because the additional compaction benefit that the tighter twist might convey is accompanied by a severe reduction in service life.

SUMMARY

Disclosed herein are methods, systems, and components for the design of angular flat belt drive systems that contain aggressive twist geometries with a negligible reduction in service life as compared to untwisted geometries. Using these methods, a certain implementation achieve twist ratios as aggressive as 7:1, for example, with only minor penalties of service life, thereby rendering more compact design envelopes.

Proper design technique for implementing such twist ratios flows from a fundamental understanding of the failure modes of flat belts subjected to both fleet angles and twisted geometries at a sheave interface. Three failure modes dominate in the case of a straight (non-twisted) flat belt subjected to a significant fleet angle: sidewall abrasion of the belt jacket along the flange that is preventing the belt from traveling to its neutral position along the sheave, tension-based cupping failure or fatigue failure of the wires that are opposite the sidewall contact edge, and premature jacket degradation beneath the wire ropes that are subjected to higher tension. It is worth noting that these three conditions happen in concert: A misaligned sheave will shift the tension distribution within the belt, causing higher belt tension and resultant sheave pressure on the "high corner" of the sheave. The uneven pressure distribution is a driving force in causing the belt to run to a neutral position on a flangeless cylindrical drum. However, if there is a flange present, it will oppose the net pressure distribution on the belt with contact along the sidewall of the belt opposite the high tension. The condition of a fleet angle is thus triply damaging, causing undue stress on the sidewall of the belt's jacket, the reinforcing strands, and the jacket material between the sheave surface and the strands on the high-tension side of the belt.

Subjecting a free span of belt between two sheaves to the twisted geometry of an angular drive also causes undue stress to the belt via a number of mechanisms. First, the twisting of any reinforced flat belt geometry causes tension to shift to the outermost strands in a substantially parabolic plus a constant distribution. This is due to the longer helical path that the outer strands must traverse in comparison to a strand that is near the center of the belt. Depending on materials and geometry, however, this tension inequality may be minor.

In practice, twisted flat belts of a steel reinforced polyurethane construction fail due to sheave interactions long before they reach a bending, tension, or twisting stress fatigue associated with the twist of the belt itself. To understand this, we must consider that a twisted flat belt carries an overall twisting moment in addition to its tensile load. This can be readily seen with any free-body section cut of a twisted belt span: The tension vectors of the outer strands are not parallel with the central axis, as they follow the helical path of their respective wire ropes. Once integrated across the strands to achieve resultant belt loads, the non-parallelism of the individual tension vectors result in the aforementioned twisting moment that is being carried through a twisted belt at all points in a free span.

This twisting moment that runs through the belt's free span must be supplied by the supporting bodies at either end of the free span, whether they be sheaves or terminations. If one imagines a pair of sheaves that consist of two cylindrical rollers pressing on both sides of the belt, pressure on the faces of the opposed rollers provide the contact necessary to impart the twisting moment onto the belt in a pleasantly symmetrical fashion. The main sheave is then free to provide redirection pressure to the flat belt in a standard manner. In this situation we should expect reductions in service life associated only with the stresses induced by the twisted geometry itself, which are minor.

However, most sheave designs do not have an opposing roller whose sole purpose is to help supply the twisting moment that runs through the span. Because the main sheave can only apply pressure to the bottom surface of the belt, it must achieve the twisting moment via other methods: namely, a lateral shift in pressure distribution to one side of the sheave in conjunction with main sheave pressure that keeps the belt in contact with the sheave's surface. This shift is visually distinguishable (See FIG. 5): The line of engagement between the belt and the sheave rotates from parallel to the sheave's rotation axis to a skew angle. As a result, the belt receives asymmetric support from the sheave, with contact on one edge of the belt occurring prior to contact on the other edge as belt engagement onto the sheave occurs. This causes the tension distribution within the reinforcing strands of the belt to shift towards the edge of the belt that first receives contact from the sheave, as any geometric imposition onto a belt that lengthens its reinforcing strands from their free span state results in a higher tension condition within the affected strands. The unequal tension distribution in the strands then causes a sidewall pressure response on the side of the belt opposite the high-tension condition.

Accordingly, one aspect of the present invention provides methods of employing a belt for an angular drive. The methods include applying a twisted geometry to a first free span of the belt, supporting the first free span of the belt via a freely rotating sheave or a driven sheave at a first extremity of the first free span and at least one of positioning and orienting the rotating sheave or the driven sheave so as to misalign a geometric centerline of the first free span of belt at a given fleet angle with respect to a second extremity of the first free span.

The belt is a flat belt (i.e. no teeth). In some implementations, the flat belt is at least one of a steel belt, an aramid belt, a polyester belt, a polyurethane belt, and a synthetic fiber reinforced belts. In some implementations, the freely rotating sheave or the driven sheave include one or more flanged sheaves.

In some implementations, a direction and a magnitude of misalignment of the given fleet angle of the first free span of belt is commensurate with that of an untwisted and misaligned second free span of belt with a supporting sheave whose total differential of tension across the untwisted and misaligned second free span of belt from one edge to an opposite edge at an engagement interface of the untwisted and misaligned second free span of belt is substantially the opposite of the total differential of tension from one edge to an opposite edge of the first free span at an engagement interface of the first free span having the twisted geometry.

In some implementations, the first free span of the belt includes a twisted geometry having twist ratios of 20:1 or less and having the given fleet angle in the range of 0.25-1.5 degrees.

In some implementations, the freely rotating sheave or the driven sheave include one or more sheaves having one dimension of introduced fleet angle misalignment for the first free span of the belt that has a twisted entry on one engagement interface of the sheave and a straight exit at another engagement interface of the sheave.

In some implementations, the freely rotating sheave or the driven sheave include one or more sheaves having two dimensions of introduced fleet angle misalignment for the first free span of the belt that has a twisted entry on one engagement interface of the sheave and a straight exit at another engagement interface of the sheave.

Another aspect of the present invention provides apparatuses for employing a belt for an angular drive. The apparatuses include a belt having a free span configured in a twisted geometry, at least one of a freely rotating sheave and a driven sheave supporting a first end of the free span of belt, and a sheave support assembly housing the freely rotating sheave and/or the driven sheave. The sheave support assembly is configured to position and/or orient the freely rotating sheave and/or driven sheave so as to misalign a geometric centerline of the free span of the belt at a given fleet angle with respect to a stationary sheave positioned at a second end of the free span of belt and to retain the freely rotating sheave and/or driven sheave at the given fleet angle to maintain the misalignment.

In some implementations, the sheave support assembly is configured to slide.

In some implementations, the stationary sheave is orthogonal to the freely rotating sheave and/or the driven sheave.

The belt is a flat belt (i.e. no teeth). In some implementations, the flat belt is one or more of a steel belt, aramid belt, polyester belt, or another high-performance synthetic fiber reinforced belts.

In some implementations, the freely rotating sheave or the driven sheave include one or more flanged sheaves. In some implementations, the twisted geometry comprises aggressive twist having a twist ratio of 15:1 or lower. In some implementations the flanged sheave may be widened to include a groove for the belt that is about 1 mm wider than the belts (no teeth) that require flanged guidance.

Various embodiments of the present invention help reduce the magnitude of asymmetry of the tension distribution of the strands of a twisted belt span within an angular drive, thusly allowing more compact angular drive designs with comparable performance and life to non-twisted flat belt drives. One key insight enabling the invention is the observation that both well-aligned angular drives with significant twist and straight (non-twisted) belt drives with significant misalignment in the form of fleet angle exhibit similar patterns of sheave pressure, belt tension, and sidewall abrasion that lead to premature failure. If a designer is to choose a fleet angle condition whose sidewall abrasion load and non-uniform tension distribution mirror those of an existing twisted belt angular drive, the fleet angle may be added to an otherwise well-aligned angular drive such that it neutralizes the undesirable side effects of non-uniform tension distribution and high sidewall abrasion. For a given twist ratio and belt cross-section, there exists a complimentary fleet angle that allows for dramatic extension of service life of the belt by re-normalizing the tension distribution in the twisted belt that would otherwise have shifted to one edge. The inventor has found that these complimentary fleet angles are often quite significant, sometimes exceeding 1 degree (a fleet angle so severe that it would rapidly destroy a non-twisted belt within hundreds of sheave bending cycles, instead of reaching its expected ~ millions of cycles to failure.)

While introducing a fleet angle intentionally to a belt topology with free spans that are either straight or have relatively low twist may reduce the service life of a belt by a factor of 100 or more, that same fleet angle can extend the life of an aggressively twisted belt geometry by that same factor of 100 or more. For twist ratios of 15:1 or below; in service life testing for complimentary fleet angles between 0.25 and 1.5 degrees can extend the life of the twisted belt by more than two orders of magnitude.

The most effective complimentary fleet angle for a twisted free span of belt can be determined empirically without resorting to high-cycle testing. If a twisted section is run over a flanged sheave at a rapid rate (such as 7 Hz), the sidewall that receives abrasion from the sheave will heat up substantially and will be detectable with a thermal camera. Thus, one may obtain an effective complimentary fleet angle by creating a setup in which the fleet angle may be varied and changing it until the thermal camera registers a uniform heat buildup across the belt's width. One may also obtain an effective complimentary fleet angle with pressure-sensitive film, placing it between the sheave and belt surface and reading the color distribution of the film once removed. Naturally, one repeats this process, increasing the fleet angle, until the tension distribution is near uniform with minimal difference between the belt's edges.

Implementations of the present invention posits that both fleet angles and highly twisted geometries exhibit similar effects on belt tension distribution and the tribology of belt wear, and that by superposing these conditions appropriately, embodiments can employ an angular drive with aggressive twist geometries and intentionally designed complimentary fleet angles that extend belt service life dramatically.

BRIEF DESCRIPTION OF THE DRAWINGS

The skilled artisan will understand that the drawing primarily is for illustrative purposes and is not intended to limit the scope of the inventive subject matter described herein. The drawings are not necessarily to scale: in some instances, various aspects of the inventive subject matter disclosed herein may be shown exaggerated or enlarged in the drawings to facilitate an understanding of different features. In the drawing, like reference characters generally refer to like features (e.g., functionally similar and/or structurally similar elements).

FIG. 21 shows how trigonometry and a Maclaurin series permits the relative slack $\Delta L$ to be related to the size of the transition zone.

DETAILED DESCRIPTION

Following below are more detailed descriptions of various concepts related to, and exemplary embodiments of, a method of normalizing belt tension distribution within angular belt drive systems.

Figure 1:
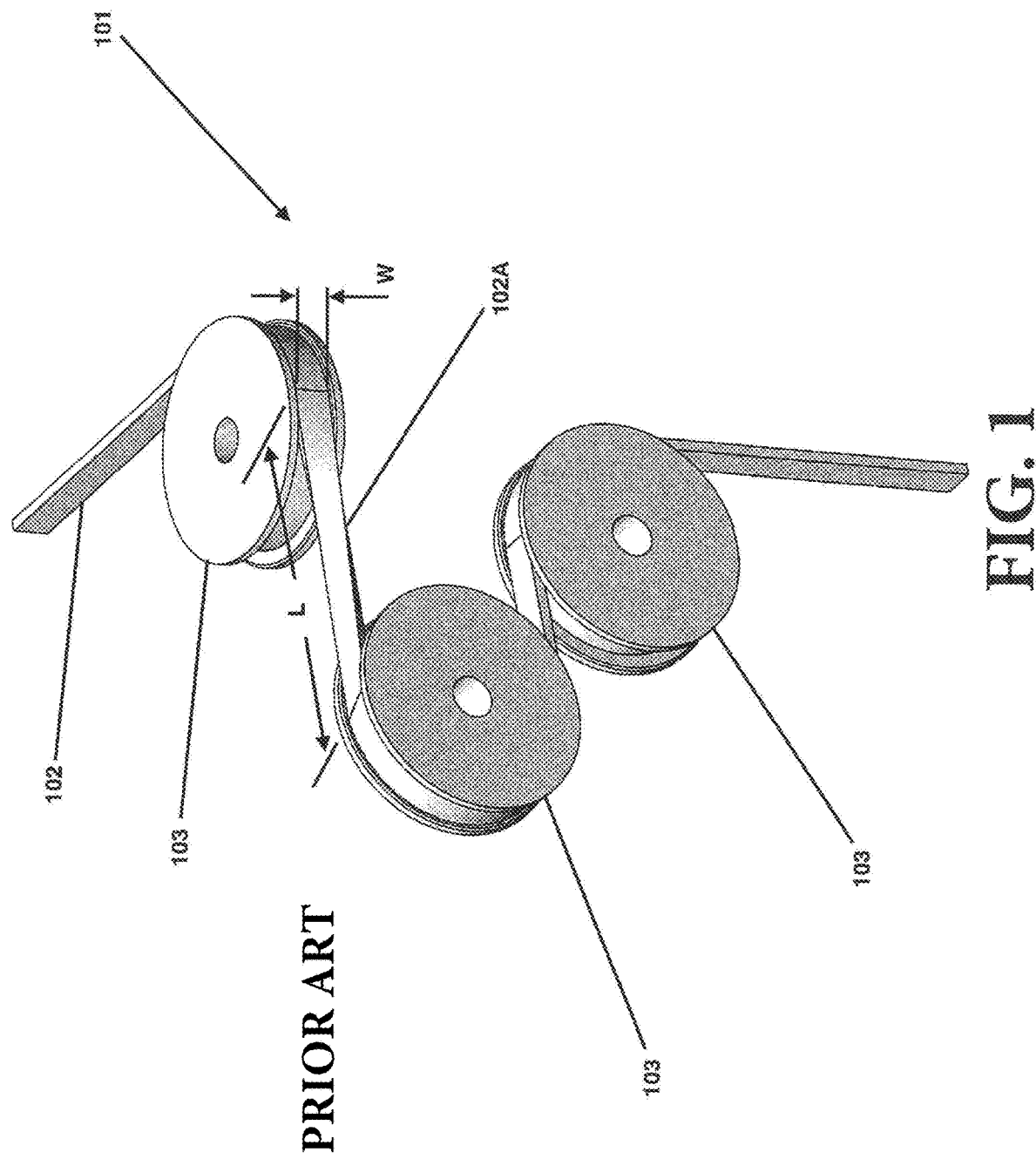
FIG. 1 illustrates some elements of a typical flat belt drive (prior art.).

FIG. 1 depicts the prior art of angular drive design with flat belts. A flat belt drive assembly 101 consists of a plurality of sheaves 103, which may include flanges for belt guidance. A flat belt 102 is wound around the plurality of sheaves 103. A single twisted free span 102A exists between two of the sheaves. As per conventional engineering practice, the belt centerline will run tangent to each of the sheave surfaces and orthogonal to each sheave's rotation axis. The twisted free span 102A is generally prescribed to have a relatively low twist, with the twist ratio (L/W) being greater than 20:1. As shown in this specimen, the twisted free span 102A has a twist ratio of about 8:1. With proper sheave alignment, this belt topology will rapidly degrade due to sidewall abrasion and an unbalanced tension distribution within the strands at the sheave interfaces.

Figure 2:
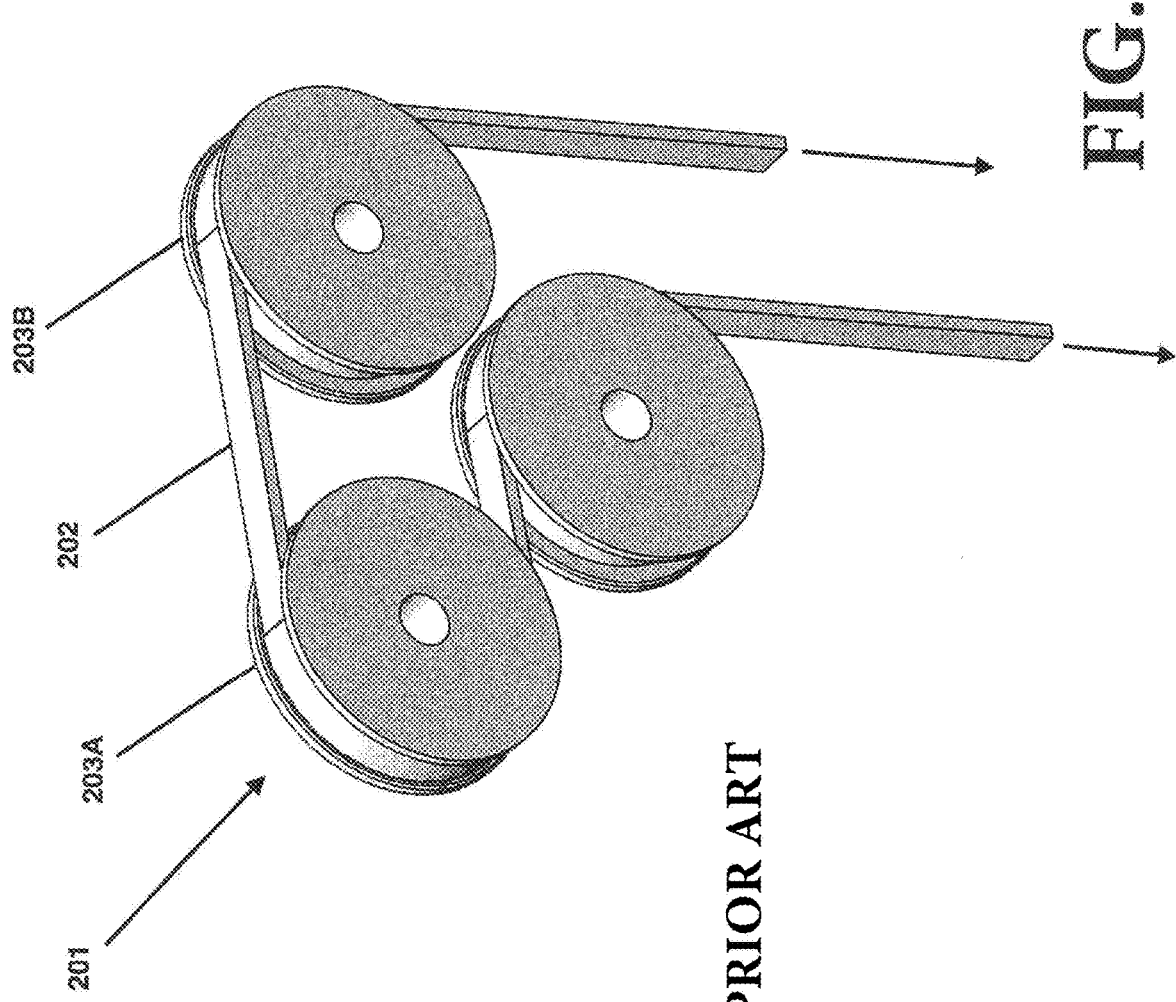
FIG. 2 depicts a flat belt drive system with flanged sheaves, parallel axes, and a parallel misalignment of sheaves that induces a fleet angle in the free span.

FIG. 2 depicts a flat belt drive design without twists and with two parallel misaligned sheaves, 203A and 203B. The fleet angle (more evident in FIG. 3) will cause rapid degradation of the belt jacket and subsequent deterioration of the reinforcement strands.

Figure 3:
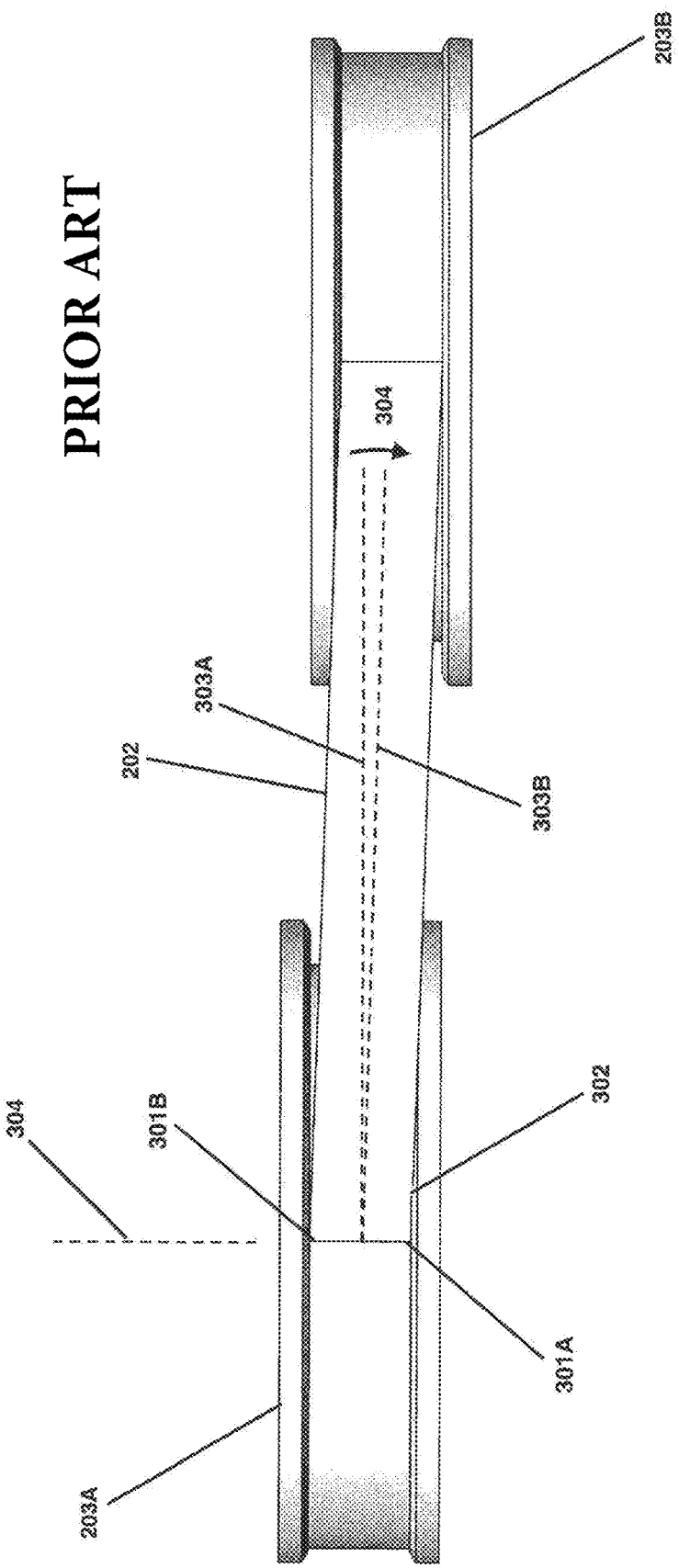
FIG. 3 shows a top view of the misaligned flat belt drive specimen.

FIG. 3 shows a top view of the specimen illustrated in FIG. 2, with sheaves 203A and 203B marked. The free span 202 has a geometric kink at either end, at the sheave engagement interfaces. The line of contact is the line at which the free span of belt comes into contact with the sheave, and is marked at the left-hand sheave by its ends 301A and 301B. The tangent centerline 303A of sheave 203A is tangent to the sheave surface and perpendicular to the sheave's rotation axis 304. The geometric centerline of a free span 202 would run through the tangent centerline 303A in a well-aligned belt drive. In this specimen, however, the geometric centerline 303B forms a small angle 304 with the tangent centerline 303A. This angular misalignment of the free span 202 with the sheave 203A is referred to as a fleet angle. Unexpected fleet angle misalignments that a designer overlooks can be responsible for premature belt failure.

Figure 4:
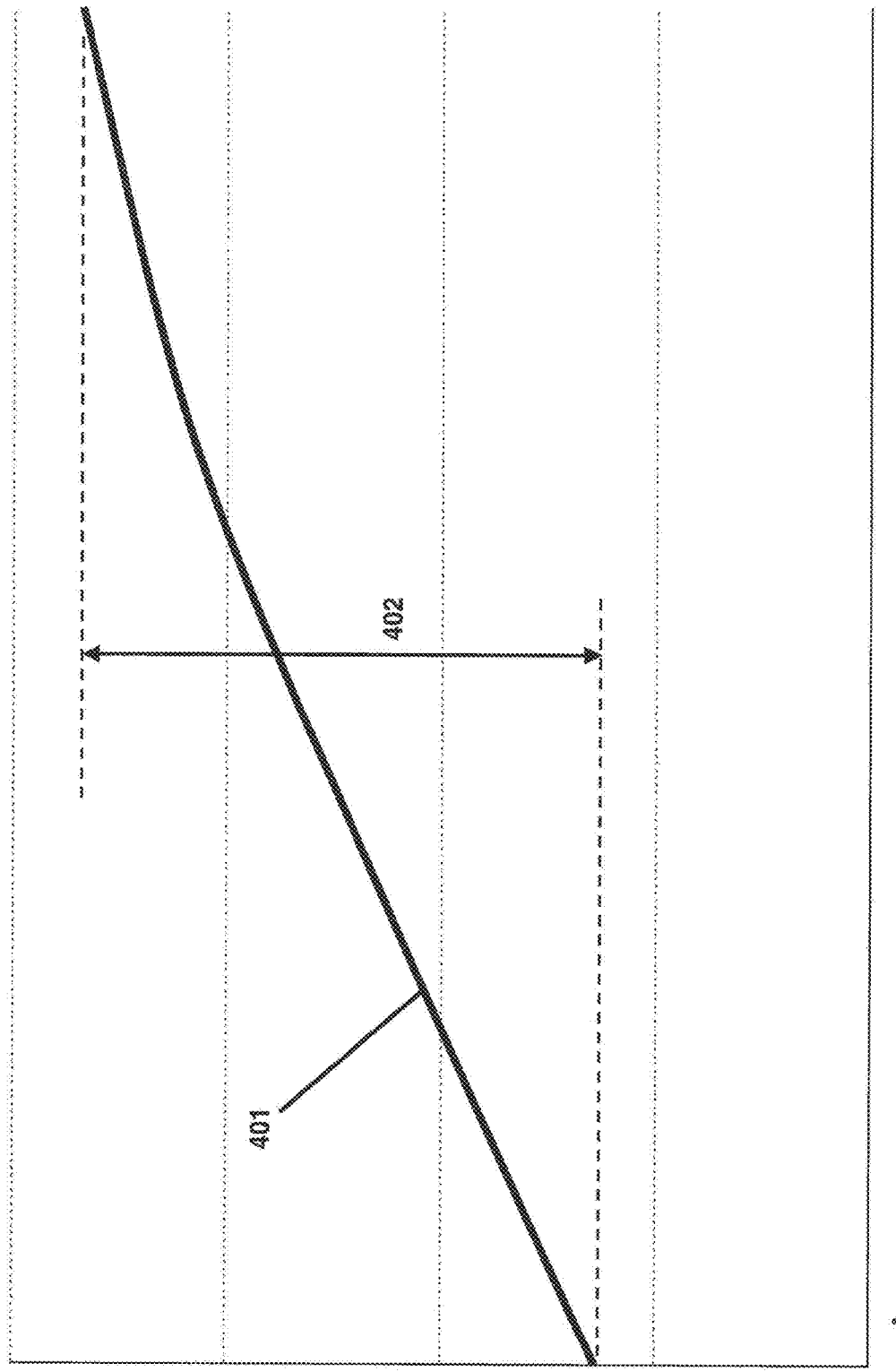
FIG. 4 is an exemplary illustration of the tension distribution evident at the sheave engagement interface of a span with a significant fleet angle.

FIG. 4 presents an exemplary tension distribution plot 401 of the reinforcement strands within the belt at the line of contact of the specimen in FIG. 3. Edges A and B correspond to the marked ends 301A and 301B of the line of contact. The fleet angle evidenced in FIG. 3 results in an asymmetric tension distribution with a bias toward the end 301B that is opposite the direction of the fleet angle shift. The magnitude of the asymmetry 402 represents the difference in strand tension between the two strands that are nearest their respective edges of the belt. The non-uniform tension distribution causes premature belt failure via three mechanisms. The high tension edge will fail prematurely due to tension and flexion stresses evident in the reinforcement strands. The jacketing material (often polyurethane) between the strands and the sheave surface will rapidly degrade due to the high level of compression that it receives from the high tension strands. Finally, sidewall abrasion with the flanged sheave at location 302 will degrade the sidewall of the jacket material.

Figure 5:
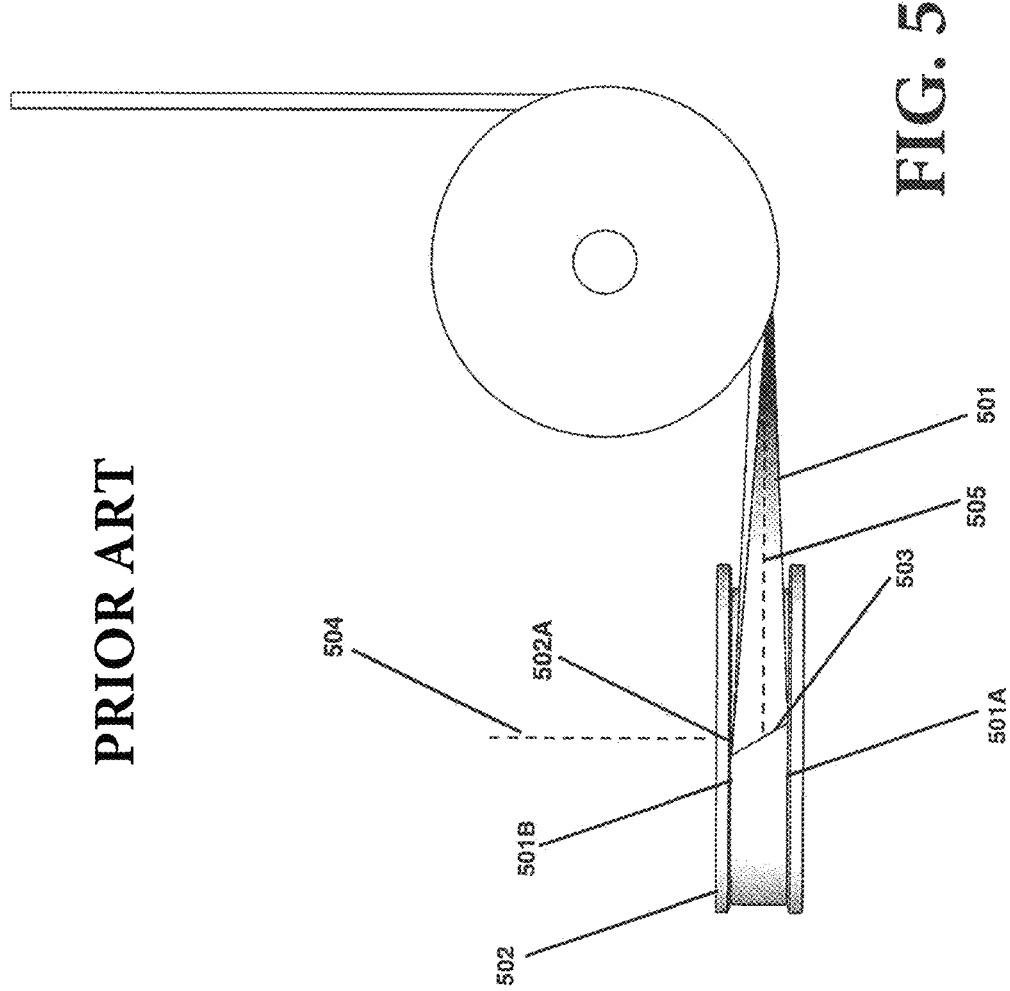
FIG. 5 presents a top view of the twisted free span evident in the FIG. 1.

FIG. 5 depicts a well-aligned angular drive with a twisted free span 501. The geometric centerline of the belt 505 is perpendicular to the axis of rotation 504 of sheave 502. For high twist ratio free spans with relatively gentle twist geometry, this alignment is correct and is used frequently. For designs with small twist ratios that have aggressive twist geometry (such as this specimen), belt failure will occur rapidly, with a 90-99% reduction in service life as compared to a high twist ratio free span. The aggressive twist causes a significant angular shift in the line of contact 503 between the free span 501 and the sheave 502, rendering it not parallel to the sheave's axis of rotation 504. The edge of the belt 501A contacts the sheave prior to the opposite edge of the belt 501B, with the additional support that edge 501A receives from the sheave causing higher tension in that side of the belt. Additionally, the twisting geometry itself causes the outer strands of the belt to follow helical paths that are longer than the inner strands which reside closer to the geometric centerline of the flat belt. The outer strands are thusly under higher tension than the inner strands. These two conditions superpose to form a highly non-uniform tension distribution within the belt at the sheave engagement interface. Like the fleet angle condition, the high-twist condition results in elevated reinforcement strand tension, high compression in the jacket material below the high-tension strands, and sidewall abrasion between the belt sidewall and the sheave flange at location 502A, all of which cause rapid degradation of the belt.

Figure 6:
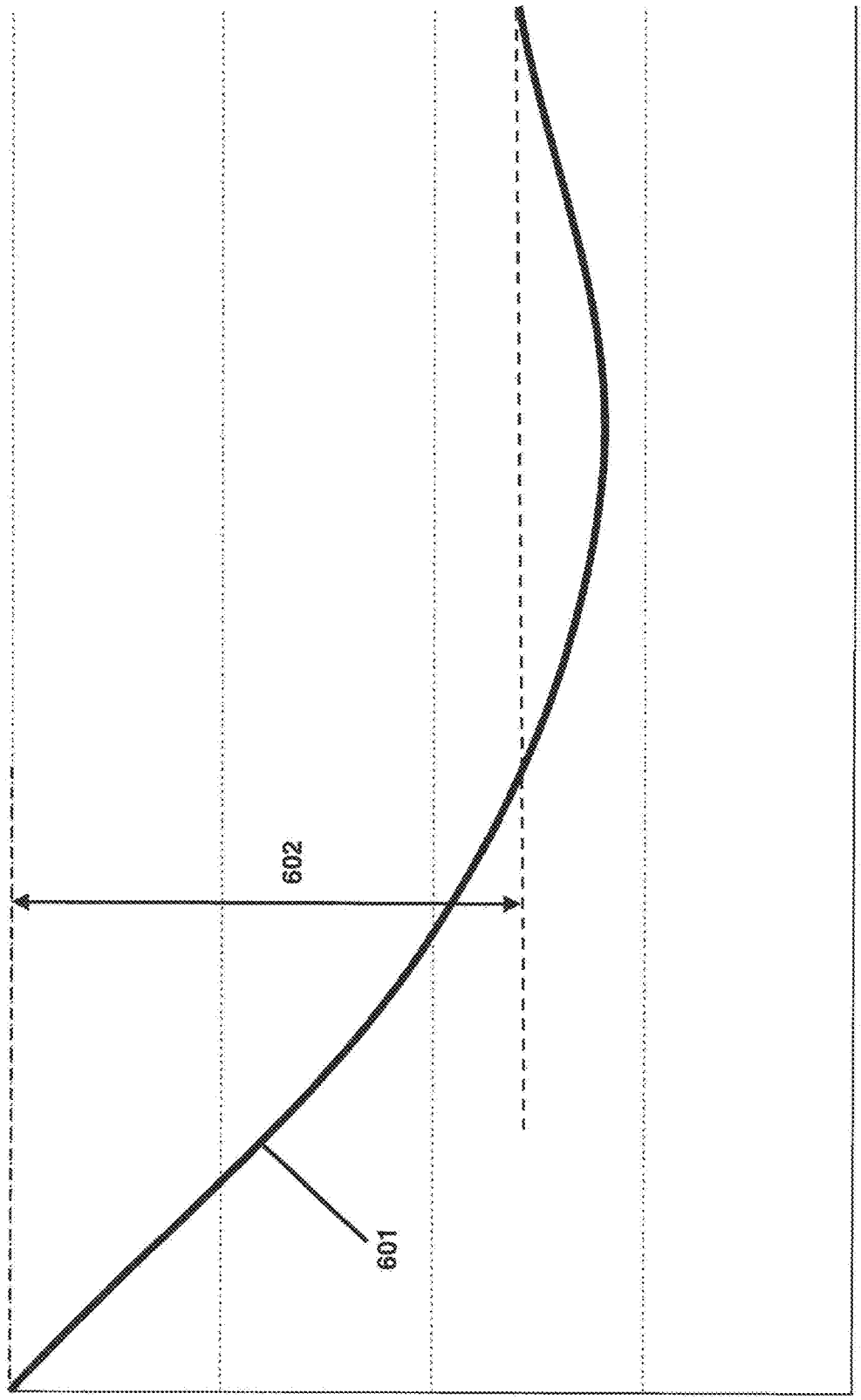
FIG. 6 is an exemplary illustration of the tension distribution evident at the sheave engagement interface of a twisted free span that is properly aligned.

FIG. 6 shows an exemplary form of reinforcement strand tension within the belt near the line of contact 503. The lower edge of the belt 501A is under substantially higher tension than its opposite edge 501B. In addition, the outer strands are under more tension than the inner strands. These two conditions jointly create the depicted tension distribution 601. The magnitude of the asymmetry 602 is negative with a bias toward edge A.

Figure 7:
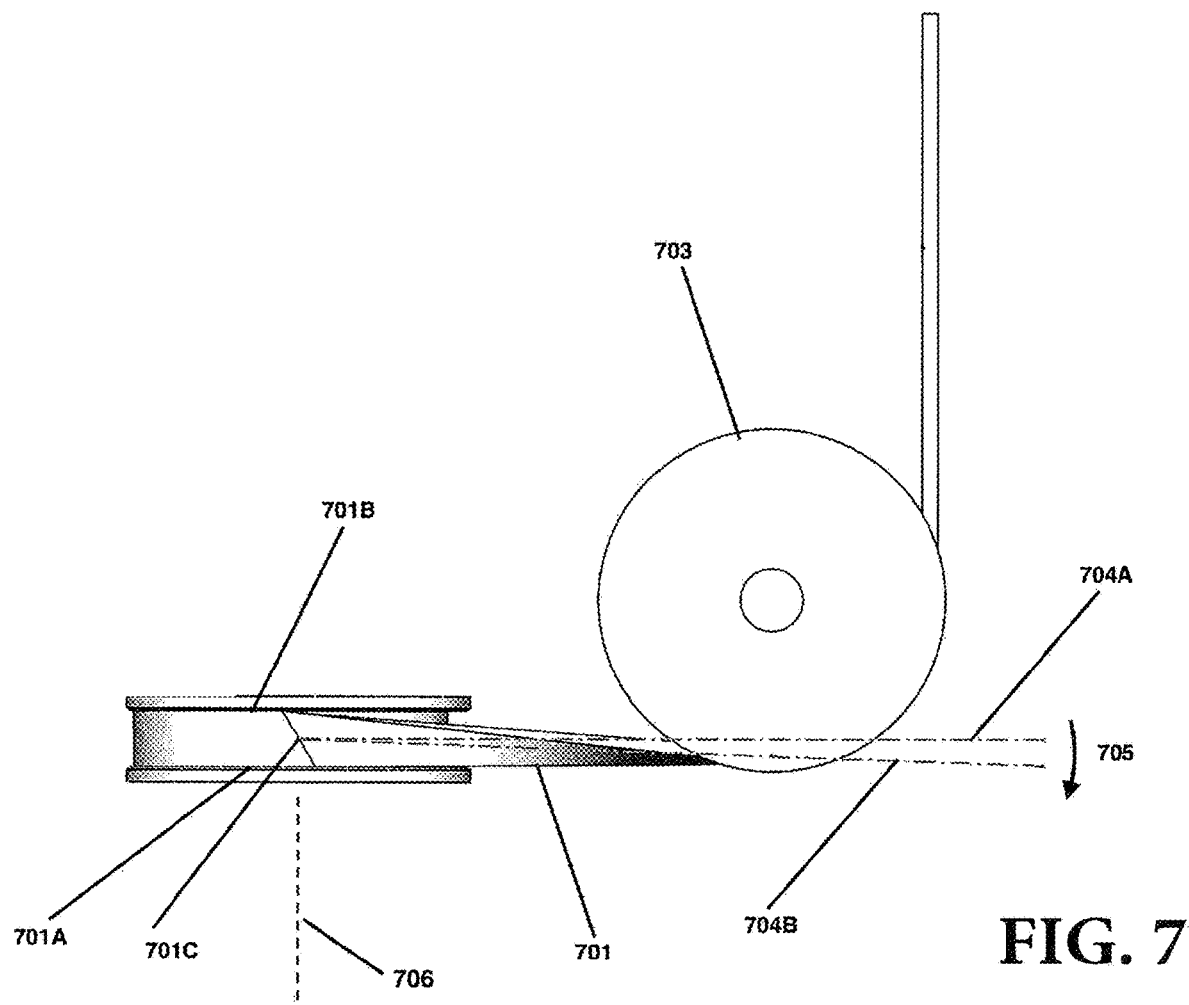
FIG. 7 depicts a top view of a specimen with a twisted free span that contains a complimentary fleet angle design element.

FIG. 7 depicts an angular drive with a complimentary fleet angle. This specimen is similar to that of FIG. 5, with a downward shift of the position of the secondary sheave 703. This causes a change in geometric centerline of the free span 701 from its well-aligned state 704A to a misaligned state 704B, creating a fleet angle 705 at the engagement interface 701C. The geometric centerline 704B of the free span 701 is thusly no longer perpendicular to the sheave's rotation axis 706. The fleet angle 705 is carefully chosen with respect to the running conditions of the belt drive and, in the case of a specimen such as this with an aggressive twist, causes a reduction in the asymmetry of the tension distribution within the belt at the engagement interface 701C. The reinforcement strands near the edges of the belt 701A and 701B are under more similar states of tension due to the intentionally introduced fleet angle 705.

Figure 8:
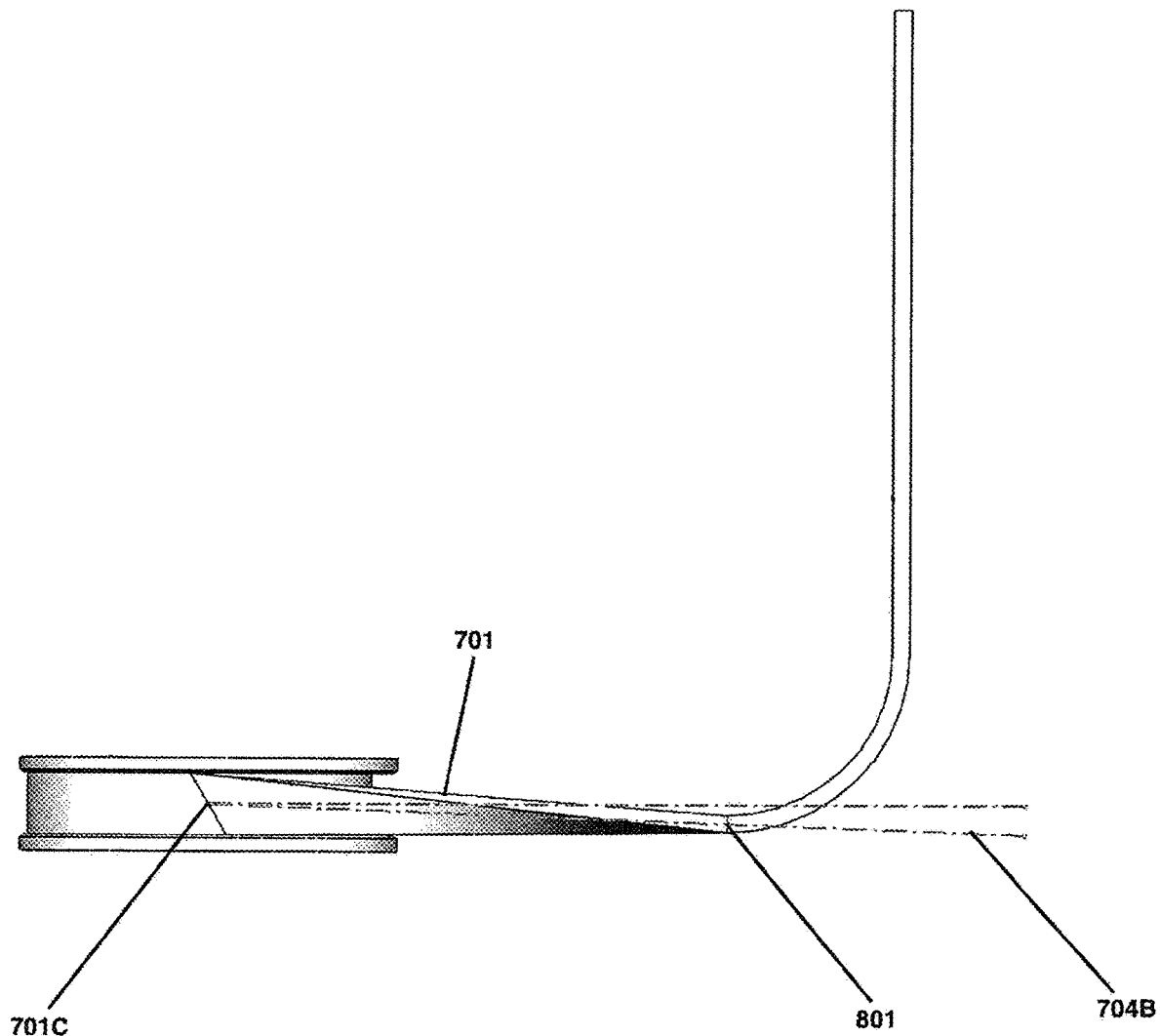
FIG. 8 depicts the same top view of a specimen with a twisted free span without the secondary supporting sheave to more clearly depict the geometric center of the belt cross section.

FIG. 8 depicts the same specimen with the secondary sheave 703 removed, so as to better illustrate the fleet angle misalignment. The engagement interface 801 with the secondary sheave 703 has been shifted by the designer from its well-aligned state and causes the free span 701 to have a fleet angle 705 at the engagement interface 701C.

Figure 9:
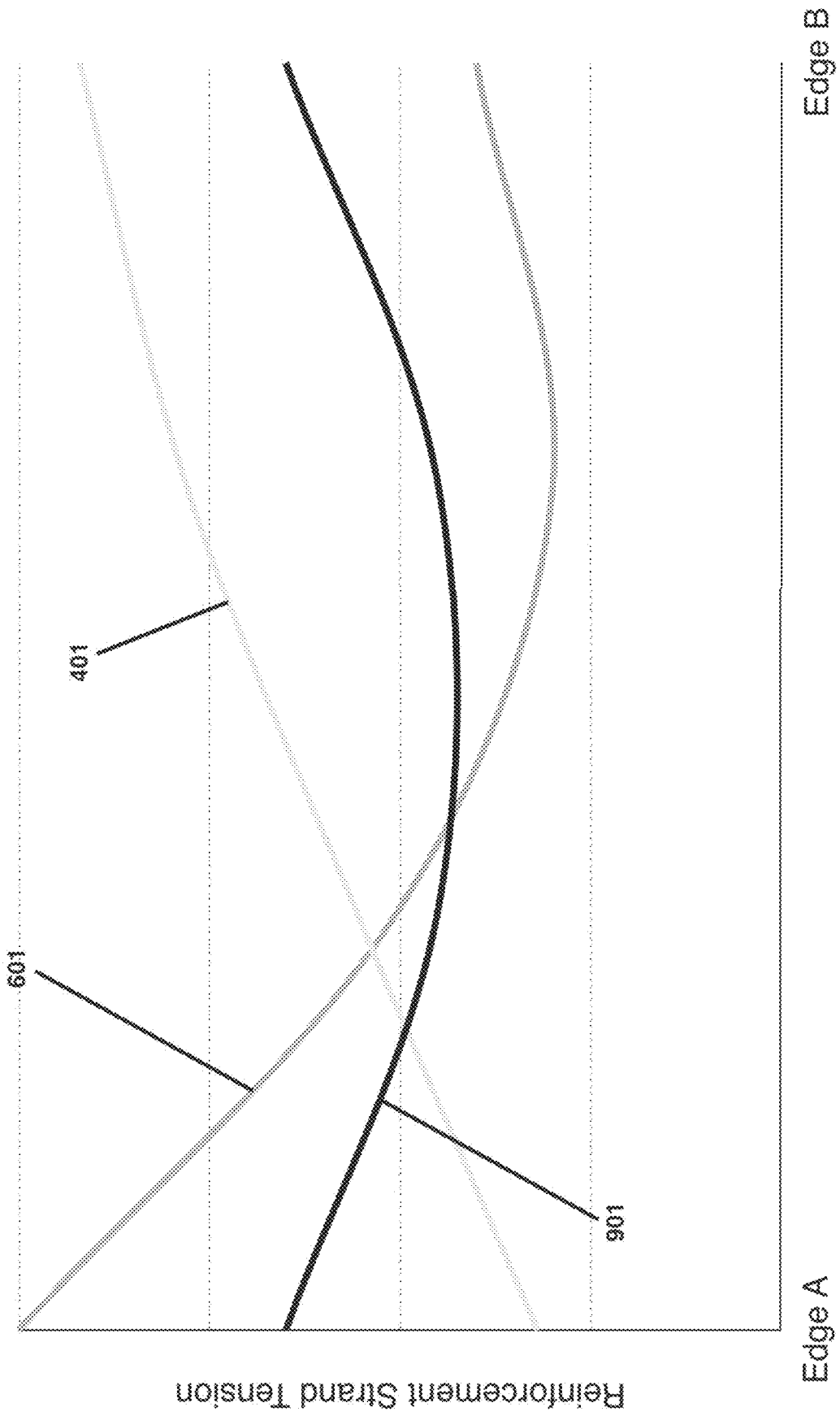
FIG. 9 is an exemplary illustration of a tension distribution of a specimen with a twisted free span and a complimentary fleet angle design element.

FIG. 9 depicts an exemplary form of tension distribution within the reinforcement strands of the belt at the engagement interface 701C. Edges A and B correspond to the edges of the belt 701A and 701B. The tension distribution 901 is substantially flat, with a low standard deviation and an identical state of tension in the outer strands that reside near the edges of the belt 701A and 701B. The tension distribution is the result of the superposition of two independent engagement interface conditions. The fleet angle tension distribution 401 (shown here for comparative purposes) has an outer strand tension differential of magnitude 402 and is positive in sign. The twisted specimen tension distribution 601 has an outer strand tension differential of magnitude 602 and is negative in sign. When the two conditions are superposed, they form the tension distribution 901 whose average is substantially similar to that of both 401 and 601 but whose asymmetry has been reduced in magnitude. This normalization of the tension distribution at the engagement interface 701C results in a dramatic extension of service life.

FIGS. 10-16 depict design use cases of complimentary fleet angles for angular drives.

Figure 10:
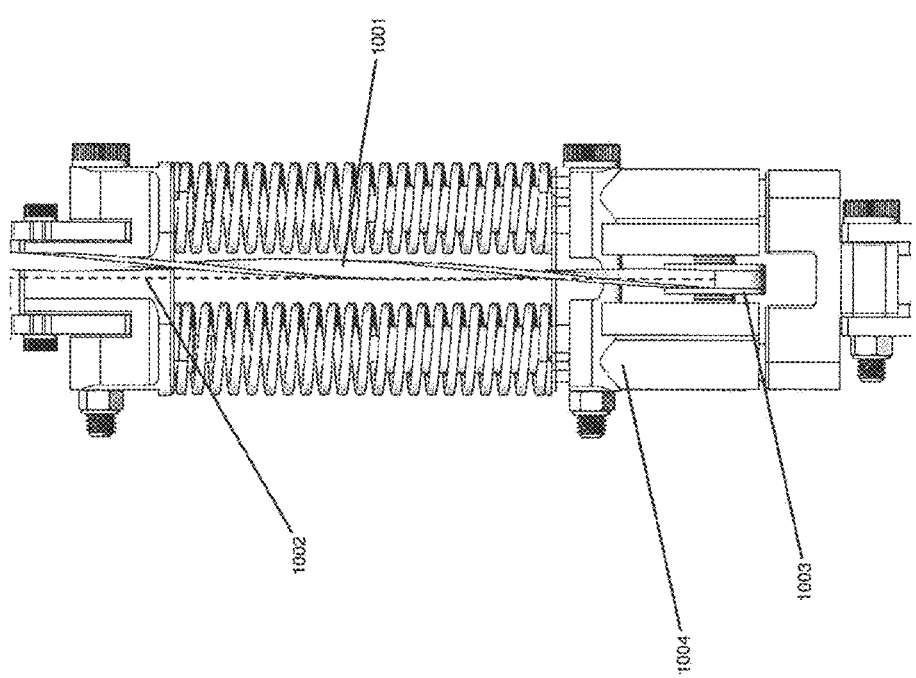
FIG. 10 illustrates a machine with a twisted free span supported by a sheave.

FIG. 10 illustrates a machine with a twisted free span 1001 supported by a sheave 1003. The belt's centerline deviates from the geometrical tangent 1002 of the sheave 1003, as shown. Supporting structures 1004 position the sheave 1003 with respect to the rest of the machine.

Figure 11:
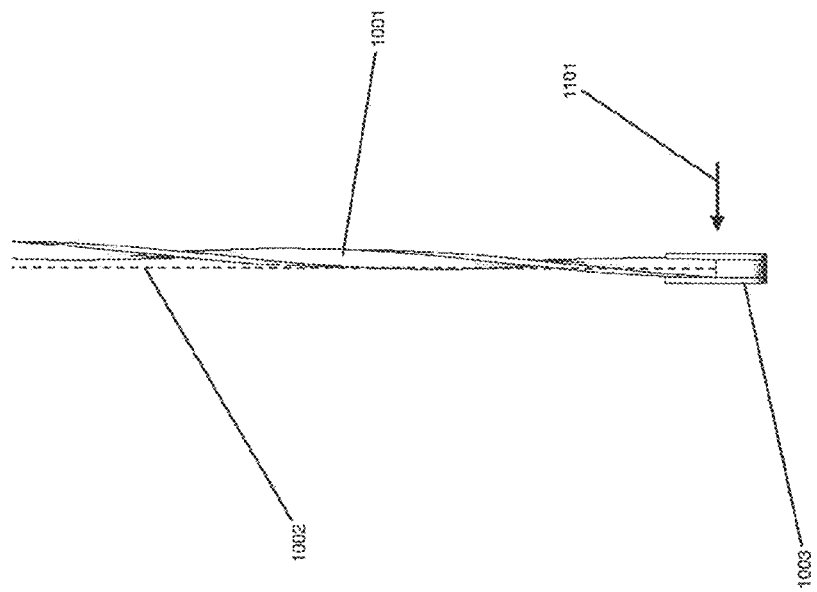
FIG. 11 shows the twisted free span of FIG. 10 without the supporting structure.

FIG. 11 shows the twisted free span of FIG. 10 with structure 1004 hidden. The supporting sheave 1003 is shifted in direction 1101 to create the fleet angle that correctly compensates for non-uniform tension at the engagement interface.

Figure 12:
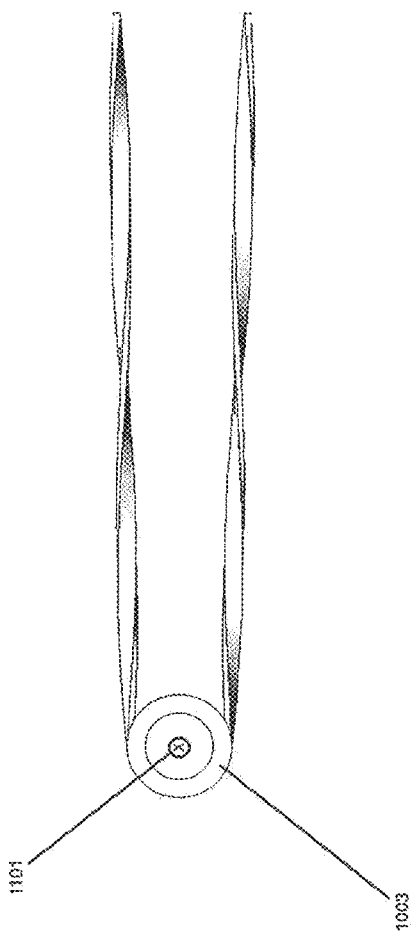
FIG. 12 depicts a side view of the implementation shown in FIG. 11.

FIG. 12 depicts a side view of the implementation shown in FIG. 11. Sheave 1003 is shifted by direction vector 1101, which is shown pointing into the page.

Figure 13:
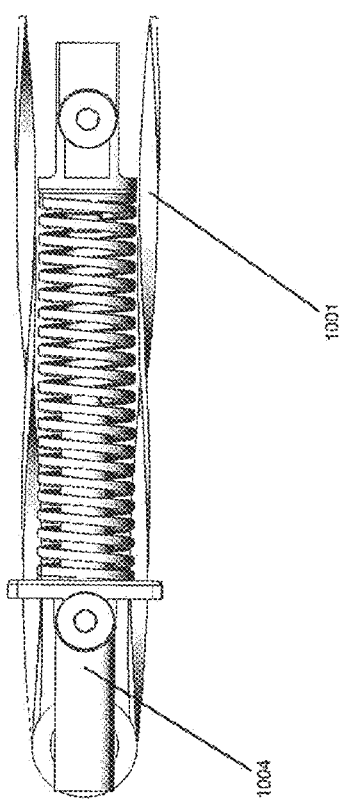
FIG. 13 shows a side view of machine illustrated in FIG. 10.

FIG. 13 shows a side view of the machine illustrated in FIG. 10 with supporting structure 1004.

Figure 14:
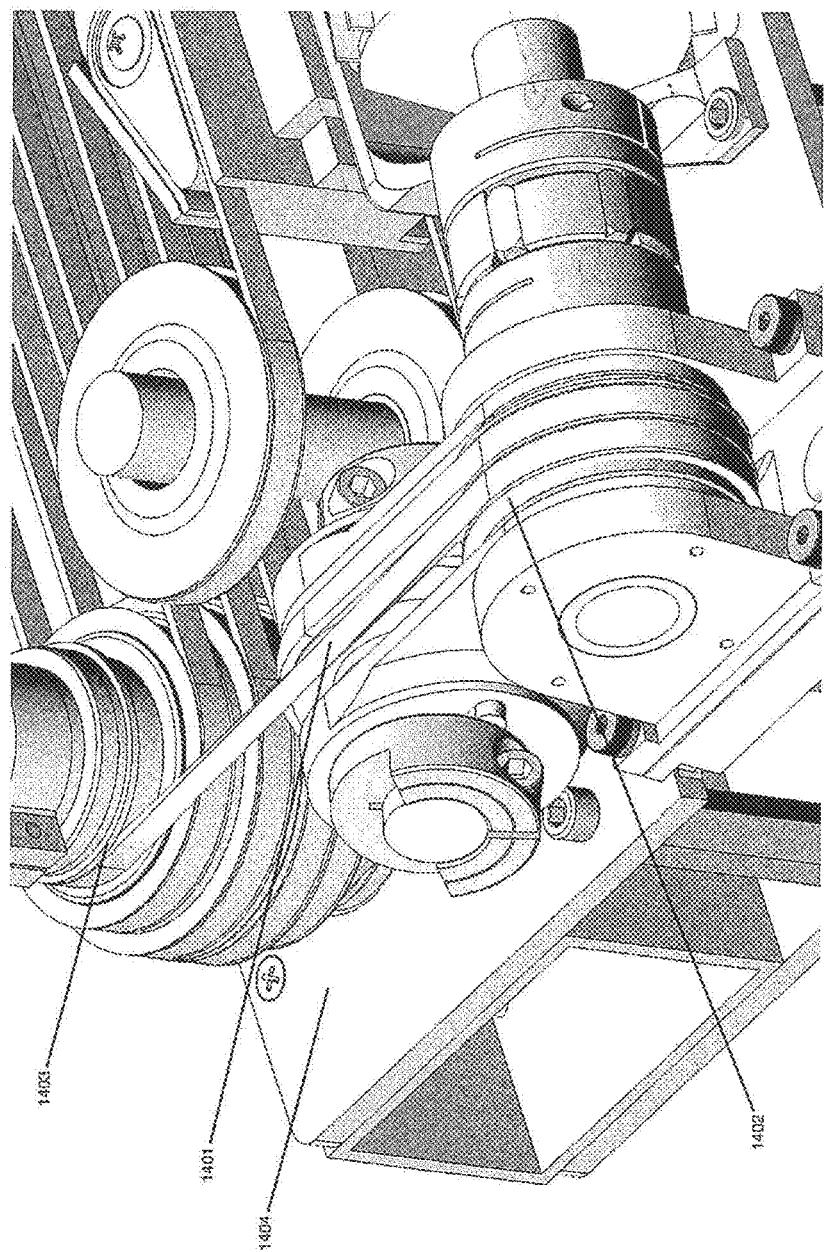
FIG. 14 illustrates another machine that utilizes a complimentary fleet angle at a twisted span.

FIG. 14 illustrates another machine that utilizes a complimentary fleet angle at a twisted span. Twisted free span 1401 is supported at either end by supporting sheaves 1402 and 1403, amongst other pulleys and supporting structures 1404, which maintain relative positions of all of the rotating components.

Figure 15:
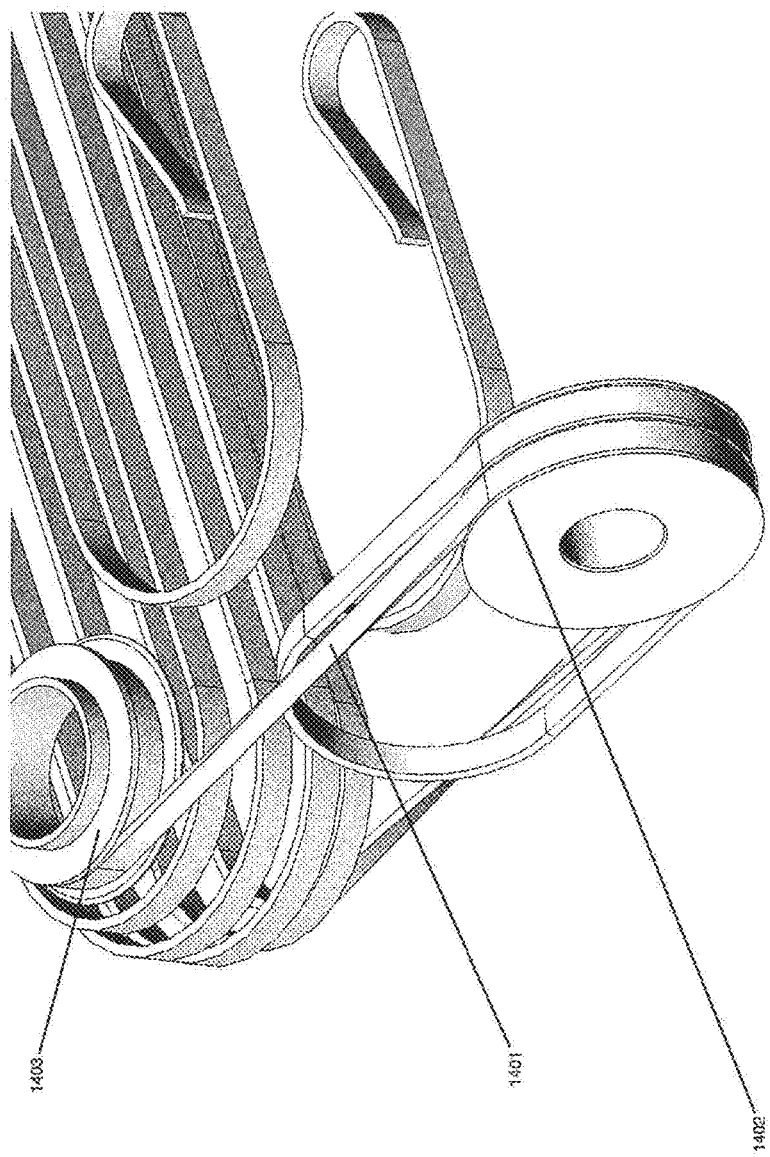
FIG. 15 illustrates the free span of FIG. 14 with the rest of the belt along with its supporting sheaves.

FIG. 15 illustrates the free span 1401 of FIG. 14 with the rest of the belt along with its supporting sheaves. The rest of the structures 1404 are hidden in this figure, for clarity.

Figure 16:
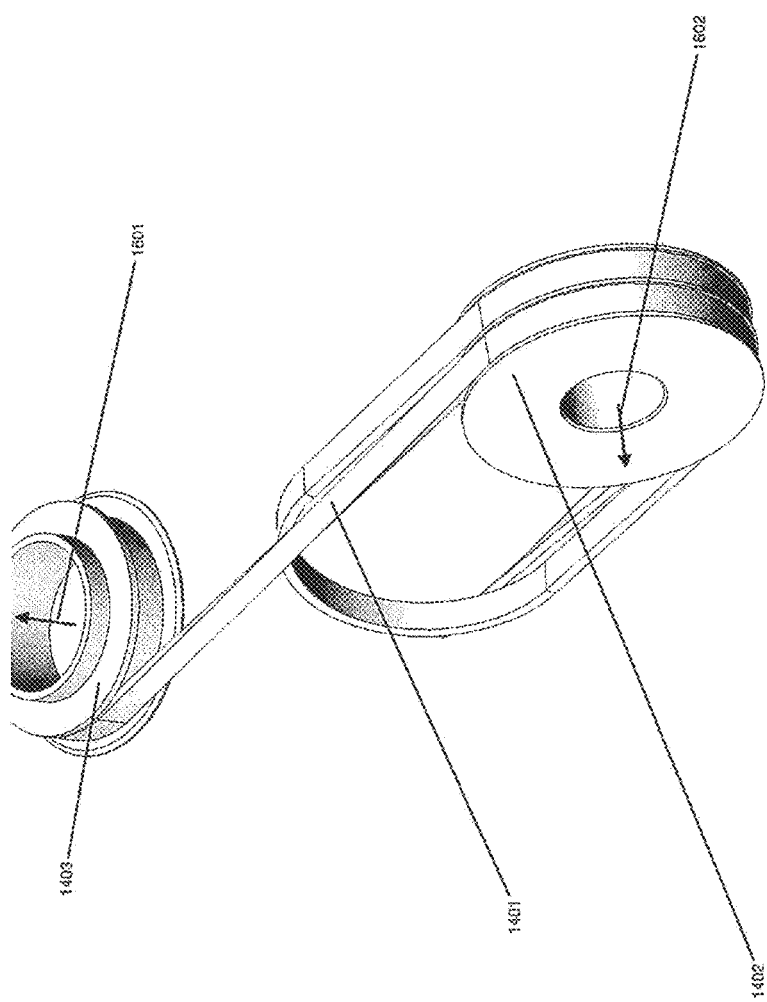
FIG. 16 shows the directions by which sheaves of FIG. 14 have been displaced from their geometrically true tangent positions.

FIG. 16 shows the directions by which sheaves have been displaced from their geometrically true tangent positions. Sheave 1402 has been shifted slightly by direction vector 1602 to normalize tension at its engagement interface. Sheave 1403 has been shifted slightly by direction vector 1601 in order to normalize the tension distribution at its engagement interface.

It should be noted that techniques embodied herein are ones of design intent: The designer has knowledge that the neutral running position of an aggressively twisted, narrow-width, reinforced belt will be substantially different than an untwisted true-running belt, which causes him or her to place guiding geometries such as sheave surfaces, flanges, or crownings in positions that intentionally cause complimentary fleet angles to prolong the service life of belts. Flanges may be unnecessary in some specific circumstances in which the disclosed design techniques are still employed.

Figure 17:
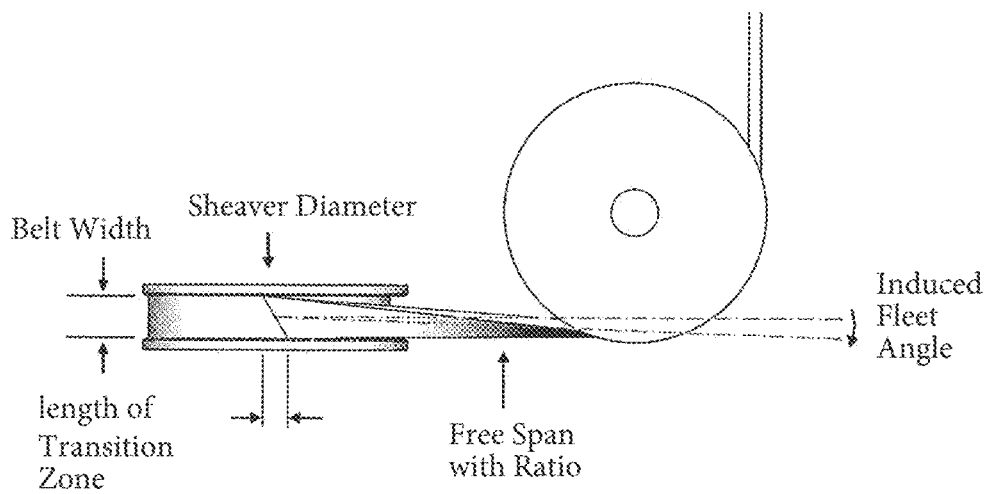
FIG. 17 shows a model twisted belt used for analyzing a twist ratio.

FIG. 17 shows a model twisted belt used for analyzing a twist ratio. The intentional introduction of a fleet angle into a twisted span engagement interface can increase the service life of severely twisted belt systems by orders of magnitude. Angular drives exhibit a non-uniform belt tension distribution that is especially severe at a sheave engagement interface. The following analysis provides a theoretical basis and a closed form solution for determining fleet angle compensation. The following analysis will use the following notations:

Total Belt Tension—T
Diameter of sheave—$D_{sheave}$
Radius of sheave—$R_{sheave}$
Centerline distance between outermost wire ropes—$\square_{os}$
Twist Ratio—(T.R.)
Length of Transition Zone—$\square$
Half Width of Belt—R
Full Belt Width—W
Helix Angle—$\Psi$
Twist Ratio—$\theta$ The following assumptions are made with respect to setting up the analysis that follows:

Wire ropes within the belt follow parallel helical paths of a radius commensurate with their displacement from the center of the belt Belts are infinitely flexible and infinitely thin, with no radial jacket compliance Small angle approximations are made for some angles of magnitude <0.1 radian Line of contact at the engagement interface between belt and sheave is skew from edge to edge and straight in form Pressure distribution within the transition zone is responsible for supplying the internal twisting moment within the free span of belt Transition zone lies symmetrically about a radius that's perpendicular to the total belt tension vector Induced fleet angle supplies a differential in length via standard bending equations wherein strain is proportional to distance from the neutral axis Derivation The overall strategy to obtain a compensatory fleet angle can be described as follows. The first step is to find the length of the transition zone. This is done via methods of load integration and load statics. The internal twisting moment of the belt is derived first, followed by the twisting moment that is imposed upon the belt in the transition zone by an unknown transition zone length X. Because the twisted free span obtains its internal moment exclusively from the transition zone, we can set an equality between these two twisting moments in order to obtain the length of the zone X.

The peripheral length X along which the belt interfaces with the sheave can be used to assess the relative geometric slack created via some relatively simple trigonometry. In the transition area, the lower edge of the belt maintains contact with the sheave while the upper edge of the belt travels through free space, causing the asymmetry of length that leads to an asymmetry of tension.

The calculated difference of length at the transition zone is then opposed by a net difference of length created by the fleet angle, modeled as a simple beam in bending in which strains are proportional to distance from the centerline. A fleet angle of an unknown magnitude is set to counter the net difference of length derived in part 2, rendering an equalization of length along the outer edges of the belt.

Part 1—Obtaining the Length of the Transition Zone, X.

A helical geometry model is used to obtain the helix angle of the reinforcing wire ropes within the belt, as a function of r, the distance from the center point of the belt. The helix angle, is then related to the twist ratio, T.R.

Helix $$\tan \phi = \frac{\Delta L}{R \Delta \theta} \rightarrow \frac{R \Delta \theta}{\Delta L} = \cot \phi$$

$$\text{for } \Psi \text{ small: } \Psi = R \frac{d\phi}{dL}$$

Analysis of a twist ratio context.

$$T.R. = 20 \leftrightarrow 90° @ \frac{L}{w} = 20$$

$$\frac{L}{2R} = 20 @ \frac{\pi}{2} \text{rad twist} \rightarrow \Psi = R \left( \frac{\frac{\pi}{2}}{2R(T.R.)} \right)$$

$$L = 2R(T.R.)$$

$$\Psi = \frac{\pi}{4(T.R.)}$$

For $T.R. = 20$, $\Psi = \frac{\pi}{80} \rightarrow \left(\frac{\pi}{80}\right)\left(\frac{180}{\pi}\right) deg = 2.25$ degrees.

The internal twisting moment of the belt is derived by integrating the non-axial component of tension within the belt's reinforcing wire ropes. The internal twisting moment is found to depend on the belt width (total width=2R), total tension T, and helix angle $\Psi$.

Figure 18A:
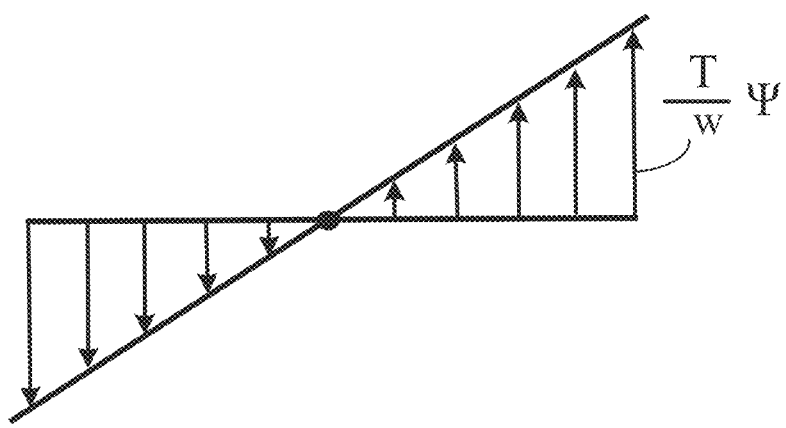
FIGS. 18A and 18B show the modeling of orthogonal (non-axial) tension component of a belt.
Figure 18B:
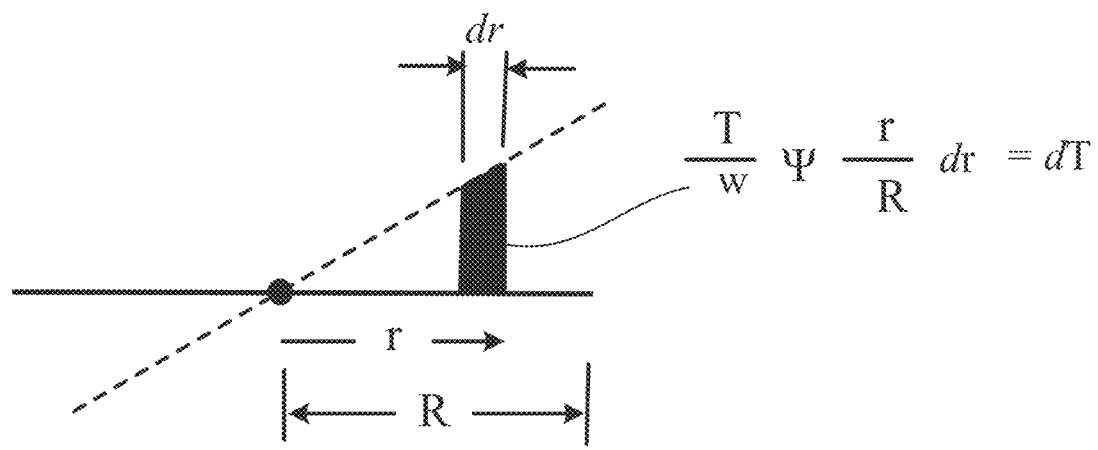

Analysis of internal twisting moment within a belt of given T.R. Given a belt with total tension T, width w, and uniform distribution of magnitude T/w, the orthogonal (non-axial) tension component can be modeled as shown in FIGS. 18A and 18B, where $$\Psi = \frac{\pi}{4(T.R.)}$$

$$\frac{T}{w} \Psi$$

$$\frac{T}{w} \Psi \frac{r}{r} dr = dT$$

$$dM = rdT = \frac{T}{w} \Psi \frac{r^2}{R} dr$$

$$\frac{T\Psi}{R^2} \int_0^R r^2 dr = \frac{T\Psi}{R^2} \left[ \frac{R^3}{3} - 0 \right] = \frac{RT\Psi}{3}$$

The following work sets up the two-dimensional surface integral that is used to find the rotational moment that the sheave imposes upon the belt in the transition zone due to the asymmetric nature of the contact.

Figure 19A:
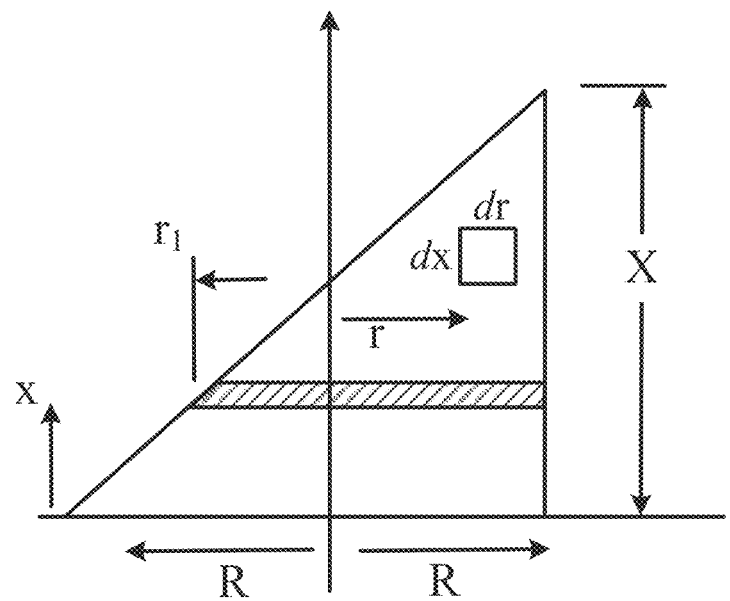
FIGS. 19A and 19B illustrate analysis of the transition contact into a sheave.
Figure 19B:
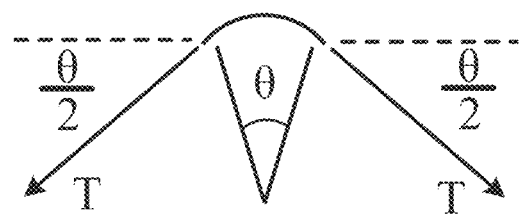

The transition contact into a sheave assuming a straight line of contact, LOC, can be described pursuant to FIGS. 19A and 19B. Based on FIGS. 19A and 19B, $$dM = rPdxdr$$

$$M = \int_0^X \int_{f(x)=r_1}^R rPdxdr$$

$$r_1 = -R + 2R\left(\frac{x}{X}\right)$$

$$M = \int_0^X \left[\int_{f(x)}^R rPdr\right]dx$$

Evaluation of the two-dimensional integral results in a formulaic basis for the rotational moment supplied at the transition zone $M_{interface}$. The rotational moment supplied at the transition zone is found to be a function of the length of the transition zone X, the X, the average sheave pressure P, and the belt's half-width R, where $$M = \int_0^X \int_{-R+2R(\frac{x}{X})}^R \frac{r^2}{2}dx\left(R^2 - 4R^2\frac{x}{X} + 4R^2\frac{x^2}{X^2}\right)$$

$$M = \frac{P}{2}\int_0^X R^2 - \left(-R + 2R\frac{x}{X}\right)^2 dx$$

$$M = \frac{P}{2}\int_0^X 4R^2\frac{x}{X} - 4R^2\frac{x^2}{X^2}dx = \frac{P}{2}\int_0^X \frac{2R^2}{X}X^2 - \frac{4R^2}{3X^2}x^3$$

$$M = \frac{P}{2}\left[4R^2\frac{2R^2X^2}{X} - 4R^2\frac{4R^2}{X^2}\right] = \frac{P}{2}\left[\frac{2R^2x}{3}\right]$$

$$M = \frac{PR^2X}{3} \text{ combined with } M_{int} = \frac{RT\Psi}{3} \text{ and } \Psi = \frac{\pi}{4(T.R.)}.$$

Because the internal twisting moment of the belt is supplied by the moment at the transition zone interface, we can set an equality between the two. This allows us to find the length of the transition zone X as a function of the sheave diameter $D_{sheave}$ and the twist ratio T.R.

Setting $M_{interface} = M_{int.}$ yields $$\frac{PR^2X}{3} = \frac{RT\Psi}{3} \text{ with } \Psi = \frac{\pi}{4(T.R.)}, P = \frac{T}{(2R)(R_{Sheave})}$$

$$\frac{TR^2X}{6R\,R_{Sheave}} = \frac{RT\Psi}{3}$$

$$\frac{X}{2R_{Sheave}} = \Psi$$

For $T.R. = 7 \rightarrow \Psi = \frac{\pi}{28}, R_{Sheave=19mm}$ $$X = 2R_{Sheave}\Psi$$

$$X = \frac{\pi D_{Sheave}}{4\,(T.R.)}$$

Part 2—Assessing the Amount of Relative Slack Created Between the Belt's Edges by the Presence of the Transition Zone.

A two-dimensional geometric model sets up some of the lengths that need to be calculated, given the length of the transition zone X and the sheave radius $R_{sheave}$.

Figure 20A:
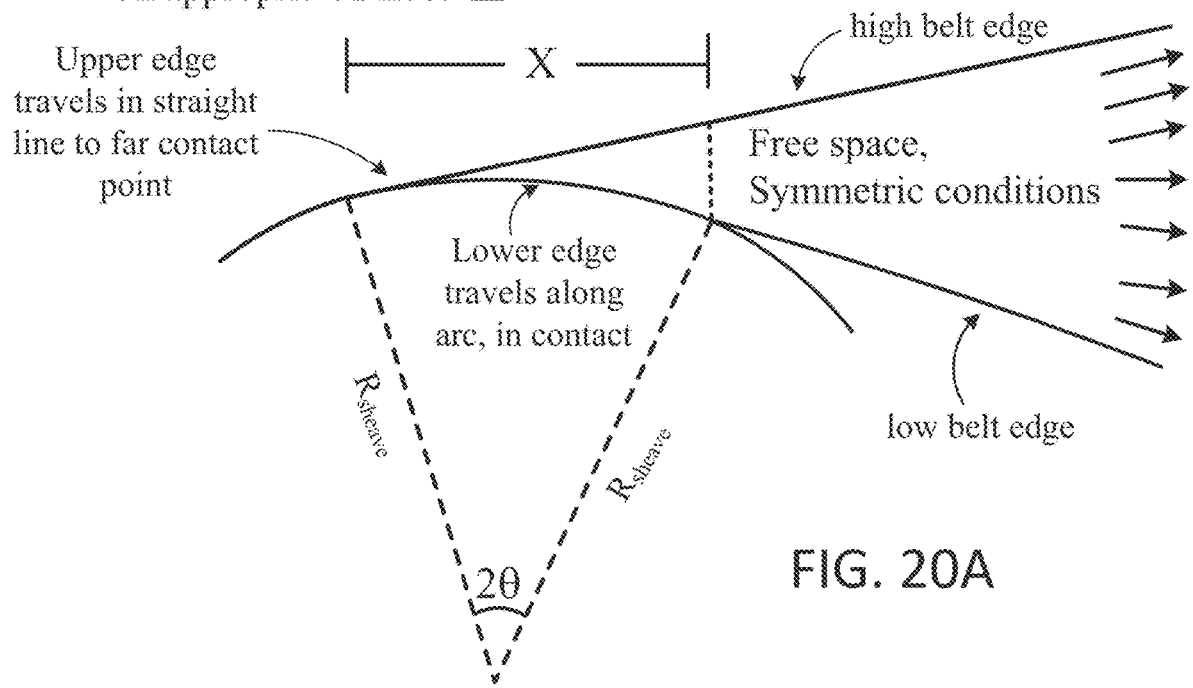
FIGS. 20A and 20B show the net length differential that can be used to find an appropriate fleet angle.
Figure 20B:
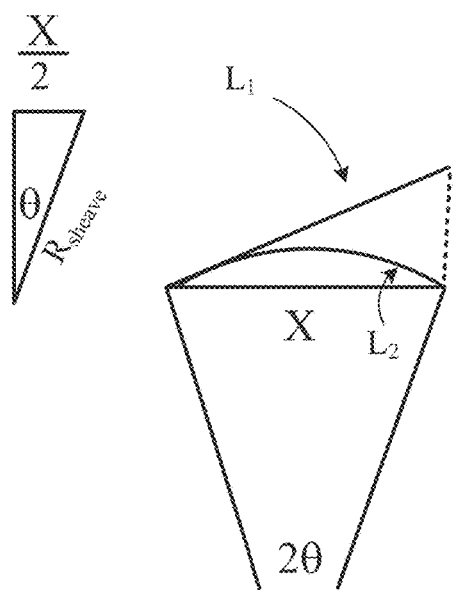
Figure 22:
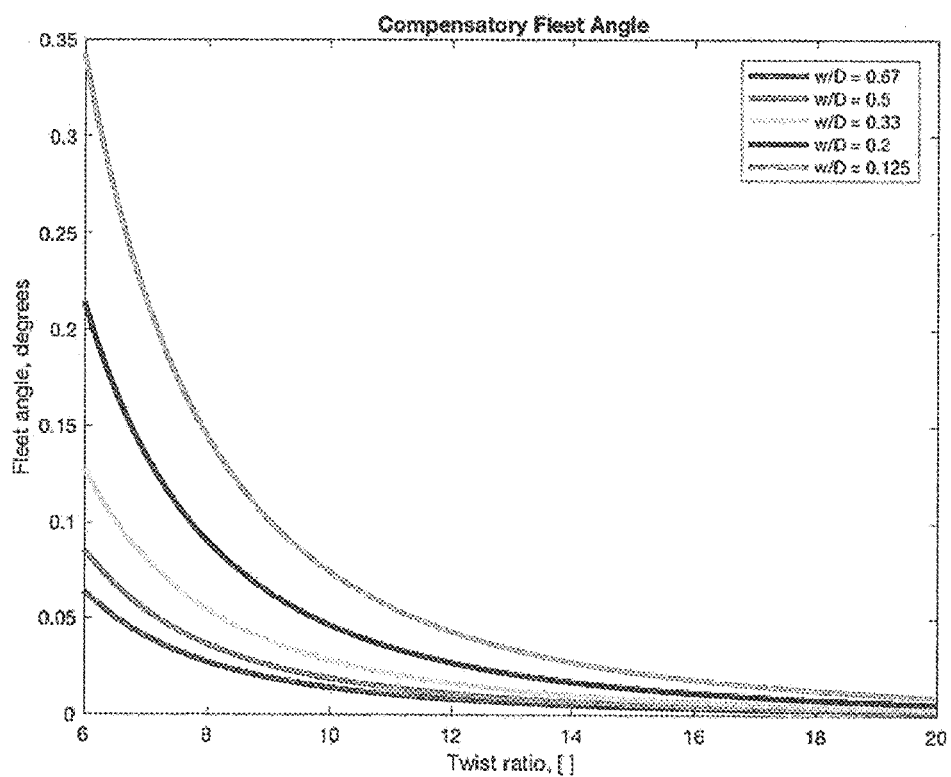
FIG. 22 illustrates a graph of theoretical compensatory fleet angle plotted as a function of the twist ratio and the width ratio.

Given the X, length of the transition interface, find the net length differential that can then be used to find an appropriate fleet angle as demonstrated in FIGS. 20A and 20B.

Using trigonometry and a Maclaurin series permits the relative slack ΔL to be related to the size of the transition zone as well as the sheave diameter as shown in FIG. 21.

Part 3—Finding the Compensatory Fleet Angle

A fleet angle is modeled via standard beam bending equations, in which the outer and inner edges of the belt each follow an arc with the same center point. The outer edge travels a greater distance than the inner edge by a factor of $\theta_{fleet}*\omega os$, where $\omega_{os}$ is the distance between the centerlines of outermost reinforcement ropes. Setting this equal to the net slack ΔL created by the transition zone results in a net-equal length condition between the two edges. This allows us to find the required fleet angle $\theta_{fleet}$.

The theoretical compensatory fleet angle can now be stated:

$$\theta_{Fleet} = \frac{\pi^3 D_{sheave}}{192\,(T.R.)^3\omega_{os}}$$

Results and Analysis.

The theoretical compensatory fleet angle can be plotted as a function of the twist ratio and the width ratio $\omega_{os}/D_{sheave}$, as shown in FIG. 21. The width ratio is simply the distance between the two outermost ropes divided by the sheave drum diameter, which increases as the belt width increases for a given drum size. It approaches the belt width ratio $W/D_{sheave}$ as the belt width increases, but for small widths, the centerline distance between the outermost wire ropes $\square_{os}$ may be a non-negligible 80% of the belt width itself. The twist ratio is non-dimensional and is quantified as the length over which a 90 degree belt twist takes place divided by the belt width.

Discussion and Conclusion

The dependencies of the compensatory fleet angle are an inverse cubic factor of the twist ratio T.R. and an inverse factor of the width ratio $\square os/D_{sheave}$. Both can be clearly seen in the above plot: As the belt width decreases for a given drum diameter, the required fleet angle increases. The cubic factor is especially impactful: For aggressively twisted belts with a twist ratio of less than 10 and a low width factor, the required fleet angle approaches the order of 1 degree in magnitude.

Empirical data suggest that the theoretical value as derived here are low by a factor of 2-3. This could be due to a variety of factors, including material compliance, belt bending stiffness, or inaccurate geometric modeling of the transition zone and the free spans. Despite the magnitude error, it is worth testing to see if the fundamental relations of an inverse cubic dependence on the twist ratio and an inverse linear dependence on the width ratio hold true throughout a substantial range of geometries and materials.

A belt power transmission designer starts their CAD by geometrically defining the ideal belt path. They do this with the understanding that, wherever twisted spans occur, a particular fleet angle that can be derived empirically or theoretically should be necessary, and they place fleet angles in the ideal belt path's geometry accordingly. The designer will then add in pulleys, terminations, etc. (at positions or of diametrical sizes that will be different than if the expectation were to be proper alignment (e.g. 2 mm larger and 1 mm wider). The designer adds in the necessary supporting structures for the pulleys.—The designer looks at tolerance and alignment for the system and adjust the alignment to be misaligned off centered as disclosed herein.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of spring systems or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B): in another embodiment, to at least one, optionally including more than one, B, with no A present (and optionally including elements other than A): in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An apparatus for employing a belt for an angular drive, the apparatus comprising:
   a belt having a free span configured in a twisted geometry;
   at least one of a freely rotating sheave and a driven sheave supporting a first end of the free span of belt; and
   a sheave support assembly configured to position at least one of the freely rotating sheave or driven sheave so as to misalign a geometric centerline of the free span of the belt configured in the twisted geometry, the free span of belt misaligned at a given fleet angle with respect to a stationary sheave positioned at a second end of the free span of belt, the sheave support assembly configured to retain the at least one of the freely rotating sheave or driven sheave at the given fleet angle to maintain the misalignment.

2. The apparatus of claim 1, wherein the sheave support assembly is configured to slide.

3. The apparatus of claim 1, wherein the sheave support assembly is configured to pivot.

4. The apparatus of claim 1, wherein the stationary sheave is orthogonal to the freely rotating sheave and/or the driven sheave.

5. The apparatus of claim 1, wherein the freely rotating sheave or the driven sheave comprises one or more flanged sheaves.

6. The apparatus of claim 5, wherein belt is a flat belt.

7. The apparatus of claim 6, wherein the flat belt is composed, at least in part, of at least one of steel, aramid, polyester, polyurethane, and a reinforced synthetic fiber.

8. The apparatus of claim 7, wherein the flanged sheaves includes a width between flanges of the sheaves that are at least 1 mm wider than the flat belt.

9. The apparatus of claim 6, wherein the twisted geometry comprises a twist ratio of 20:1 or 15:1.

10. The apparatus of claim 6, wherein the twisted geometry comprises a twist ratio of 15:1 or less.

* * * * *